United States Patent
Lee et al.

(10) Patent No.: US 7,789,516 B2
(45) Date of Patent: Sep. 7, 2010

(54) PROJECTION TYPE IMAGE DISPLAY DEVICE

(75) Inventors: Young-chol Lee, Gunpo-si (KR); Kun-Ho Cho, Suwon-si (KR); Jong-soo Lee, Cheonan-si (KR); Jae-hyun Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 762 days.

(21) Appl. No.: 11/526,583

(22) Filed: Sep. 26, 2006

(65) Prior Publication Data

US 2007/0070299 A1 Mar. 29, 2007

(30) Foreign Application Priority Data

Sep. 26, 2005 (KR) ........................ 10-2005-0089511

(51) Int. Cl.
*G03B 21/26* (2006.01)
(52) U.S. Cl. .................. 353/37; 353/69; 353/70; 353/77; 353/98; 353/47; 353/71; 353/48; 353/50; 359/449; 359/460; 359/443; 359/838; 359/850; 359/854; 359/855; 348/781; 348/782; 348/787; 348/789
(58) Field of Classification Search .............. 353/122, 353/69, 70, 98, 18, 34, 37, 47, 48, 50, 77, 353/71, 119; 359/449, 460, 443, 838, 850, 359/854, 855, 858, 859; 348/781, 782, 787, 348/789
See application file for complete search history.

(56) References Cited

U.S. PATENT DOCUMENTS

| 5,200,861 | A | * | 4/1993 | Moskovich | .................. 359/662 |
| 5,467,154 | A | * | 11/1995 | Gale et al. | .................. 353/119 |
| 6,129,437 | A | | 10/2000 | Koga et al. | |
| 6,457,834 | B1 | | 10/2002 | Cotton et al. | |
| 6,612,704 | B2 | | 9/2003 | Ogawa | |
| 2002/0044263 | A1 | * | 4/2002 | Takeuchi | .................. 353/69 |

FOREIGN PATENT DOCUMENTS

| JP | 2001-264627 A | 9/2001 |
| JP | 2002-350744 A | 12/2002 |
| JP | 2004-258218 A | 9/2004 |
| JP | 2004-279988 A | 10/2004 |

\* cited by examiner

*Primary Examiner*—Georgia Y Epps
*Assistant Examiner*—Sultan Chowdhury
(74) *Attorney, Agent, or Firm*—Sughrue Mion, PLLC

(57) ABSTRACT

A thin projection type image display device with a low chin height includes a cabinet, a screen, a projection optical system, an optical path changing unit, and a reflecting unit. The screen is disposed on a front side of the cabinet. The projection optical system enlarges and projects an image formed by a display element, and the optical path changing unit is disposed on the bottom of the cabinet to reflect the image enlarged and projected by the projection optical system. The reflection unit is disposed obliquely to the screen and below the screen to reflect the image reflected by the optical path changing unit toward the screen. The projection optical system is disposed in a space above a horizontal plane perpendicular to the screen, behind the front side of the cabinet, and below an optical path of light incident on a bottom of the screen.

20 Claims, 7 Drawing Sheets

PROJECTION TYPE IMAGE DISPLAY DEVICE

CROSS-REFERENCE TO RELATED PATENT APPLICATION

This application claims the benefit of Korean Patent Application No. 10-2005-0089511, filed on Sep. 26, 2005, in the Korean Intellectual Property Office, the disclosure of which is incorporated herein in its entirety by reference.

BACKGROUND OF THE INVENTION

1. Field of the Invention

Apparatuses consistent with the present invention relate to a projection type image display device, and more particularly, to an ultra-slim projection type image display device with a reduced height between the bottom of a screen and the bottom of a cabinet.

2. Description of the Related Art

Projection type image display devices are devices in which a display element selectively transmits light emitted from a light source to form a color image. The color image is enlarged and projected onto a screen.

Recently, brown tubes, which have a limited screen size despite being large systems, have been replaced with display devices capable of realizing a large screen size with a small thickness. Currently, projection type display devices make up a large portion of these display devices. Projection type image display devices have a slim profile and small-sized components while realizing a large screen such that the display devices can occupy a small area while realizing a large screen, and still provide high image quality.

Figure 1:
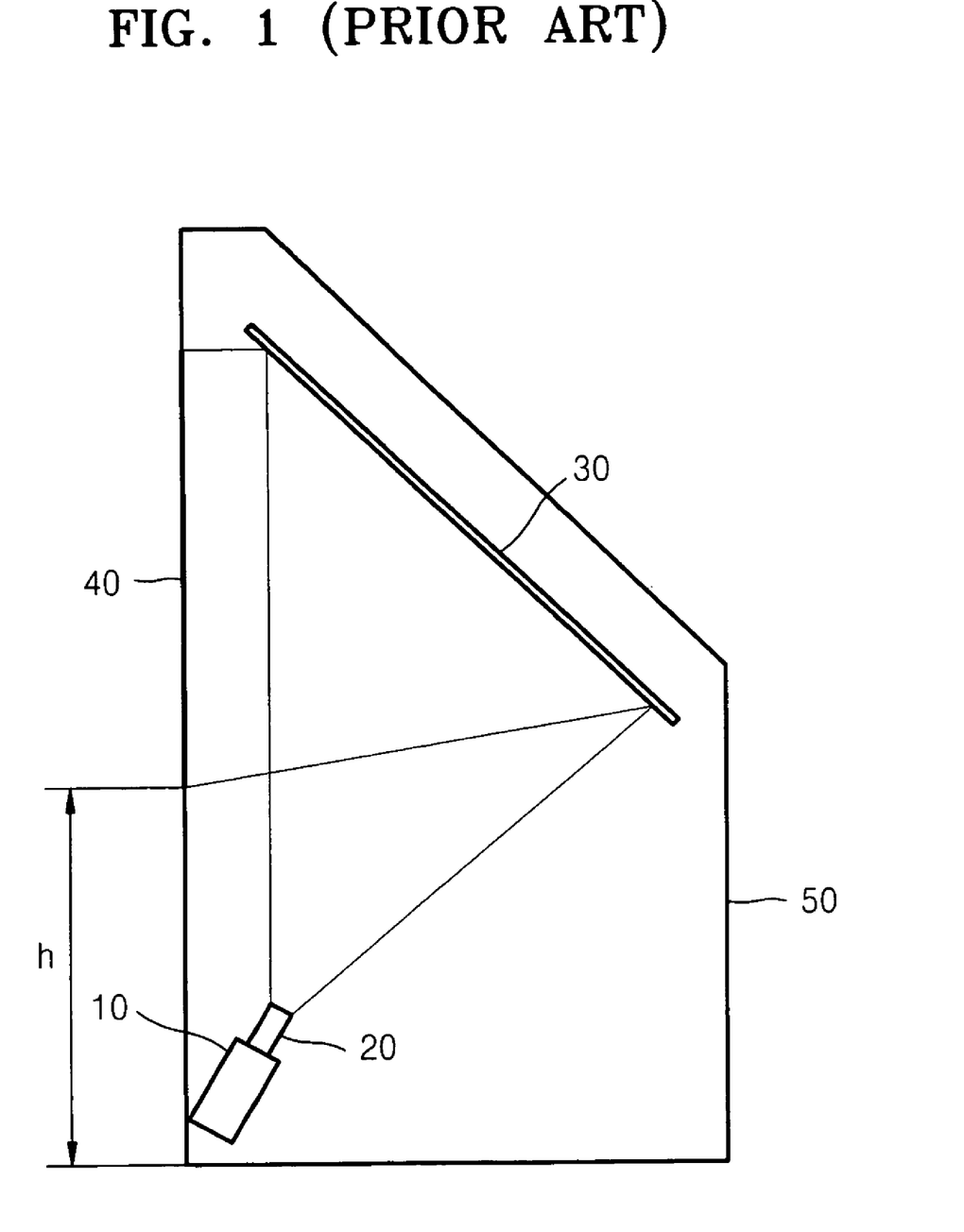
FIG. 1 is a schematic view of a conventional projection type image display device.

To realize a projection type image display device with a large screen and a slim profile, a projection optical system should generate a bundle of light rays at a wide divergence angle. However, when the projection optical system is disposed at the central portion of a screen, the angle at which a bundle of light rays from the projection optical system are incident on the screen is limited. Referring to FIG. 1, to make a cabinet 50 of an image display device slimmer, a projection optical system 20 is disposed below a screen 40 and disposed at an oblique angle to the screen. When the projection type image display device operates, an image formed by a display element 10 is enlarged and projected through the projection optical system 20 to a reflection mirror 30, which reflects the image onto the screen 40. As a result, an image that corresponds to the oblique cross-section of a light bundle projected to the screen is formed on the screen 40, so that larger screen may be realized.

However, when the projection optical system 20 is located below the screen 40, a height h of the portion (referred to as 'chin' hereinafter) between the bottom of the cabinet 50 and the bottom of the screen 40 increases.

SUMMARY OF THE INVENTION

The present invention provides a projection type image display device with a reduced chin height and a slim profile without interference with an optical path of a projection optical system.

According to an exemplary aspect of the present invention, there is provided a projection type image display device including: a cabinet; a screen disposed on a front side of the cabinet; a projection optical system, disposed below the screen, which enlarges and projects an image formed by a display element; an optical path changing unit, disposed on the bottom of the cabinet, which reflects the image enlarged and projected by the projection optical system; and a reflection unit, disposed obliquely to the screen and below the screen, which reflects the image reflected by the optical path changing unit toward the screen with a wide angle of divergence. The projection optical system is disposed in a space above a horizontal plane that passes through a lower end of an effective plane of the reflection unit and is perpendicular to the screen, behind the front side of the cabinet, and above a lower light ray plane formed by the path of a light ray incident on a bottom of the screen.

According to another exemplary aspect of the present invention, there is provided a projection type image display device including: a cabinet; a screen disposed on a front side of the cabinet; a projection optical system, disposed below the screen, which enlarges and projects an image formed by a display element; an optical path changing unit, disposed on the bottom of the cabinet, which reflects the image enlarged and projected by the projection optical system; a reflection unit, disposed below the screen, which reflects the image reflected by the optical path changing unit with a wide angle of divergence; and a back mirror, disposed parallel to the screen between the screen and the projection optical system, which reflects the image reflected by the reflection unit to the screen. The projection optical system is disposed above a horizontal plane that passes through a lower end of an effective plane of the reflection unit and is perpendicular to the screen.

BRIEF DESCRIPTION OF THE DRAWINGS

The above and other exemplary features and aspects of the present invention will become more apparent by the following detailed description of exemplary embodiments thereof with reference to the attached drawings in which.

DETAILED DESCRIPTION OF EXEMPLARY EMBODIMENTS OF THE INVENTION

The present invention will now be described more fully with reference to the accompanying drawings, in which exemplary embodiments of the invention are shown. In the drawings, the thicknesses of layers and regions are exaggerated for clarity. Like reference numerals in the drawings denote like elements, and thus their description will not be repeated.

Figure 2:
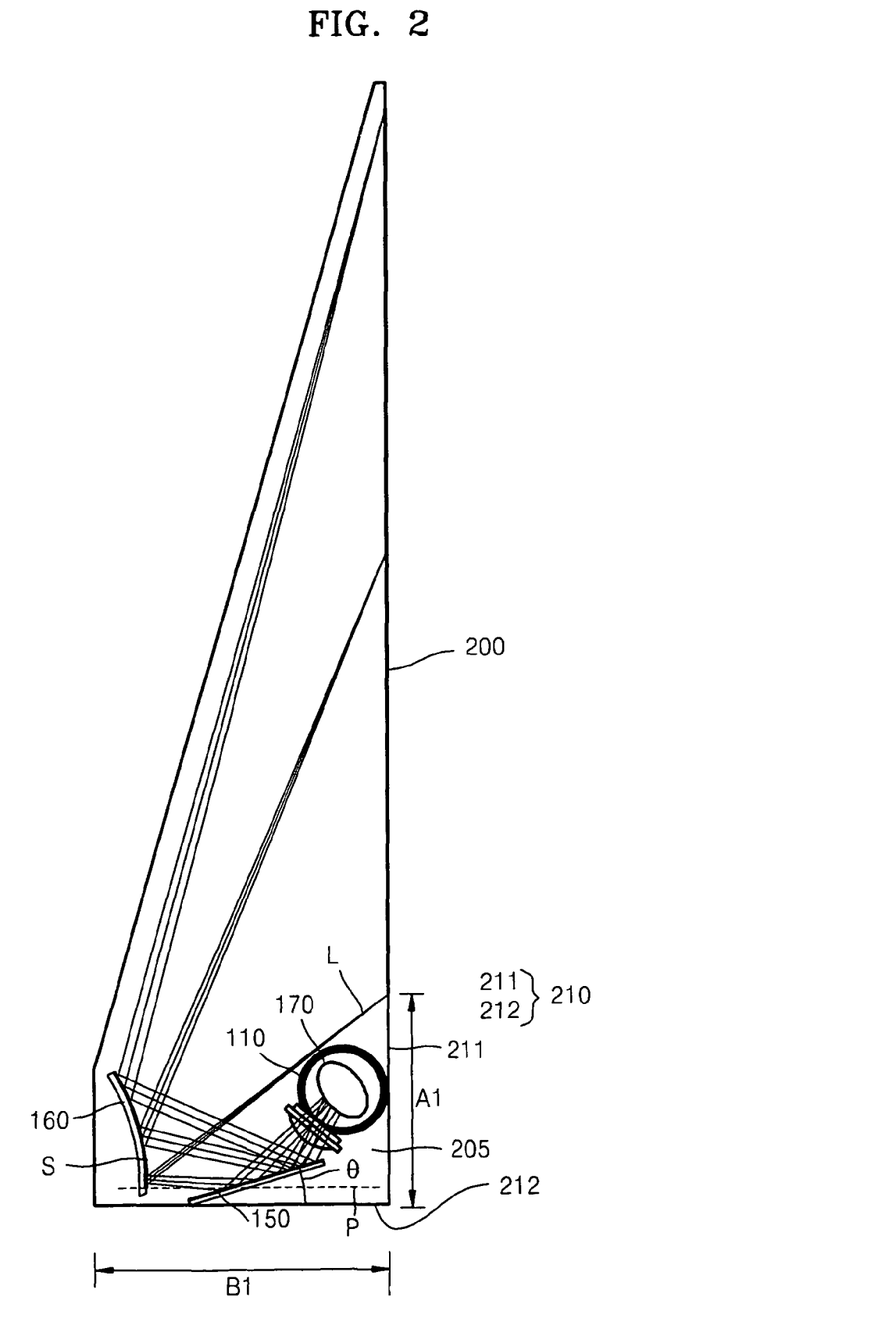
FIG. 2 is a schematic side view illustrating the optical arrangement of a projection type image display device according to an exemplary embodiment of the present invention.

FIG. 2 is a schematic side view illustrating the optical arrangement of a projection type image display device according to an exemplary embodiment of the present invention. Referring to FIG. 2, the projection type image display device includes a cabinet 210, a screen 200 disposed on the front side 211 of the cabinet 210, a projection optical system 110 disposed inside the cabinet, below the screen 200, an optical path changing unit 150 disposed on the bottom of the cabinet 210, a reflection unit 160 disposed obliquely to the screen 200 and below the screen 200, and a folding mirror 170 disposed within the projection optical system 110.

Figure 3:
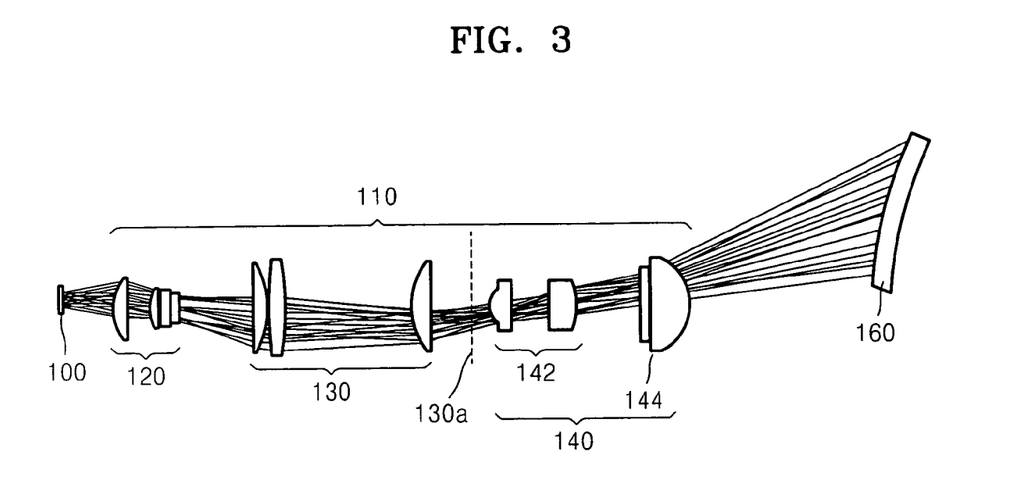
FIG. 3 is a schematic view illustrating a projection optical system of the projection type image display device of FIG. 2

FIG. 3 schematically illustrates an optical system between the display element 100 and the reflection unit 160, excluding the optical path changing unit 150 and the folding mirror 170. The projection optical system 110 will now be described with reference to FIGS. 2 and 3.

The display element 100 modulates a received beam using image information input from an image information input unit (not shown) to form an image. The display element 100 may be a digital micromirror device (DMD), a liquid crystal display (LCD), a grating light valve (GLV), or liquid crystal on silicon (LCoS).

The projection optical system 110 includes first through third lens groups 120, 130, and 140.

The first lens group 120 controls the focus of an image formed by the display element 100. The first lens group 120 may include at least one aspherical lens and may have the characteristics of a telecentric optical system.

The second lens group 130 converts the image transmitted from the first lens group into an intermediate image 130a between the second lens group 130 and the third lens group 140.

The third lens group 140 enlarges the intermediate image 130a formed by the second lens group 130 to form a large-sized image in cooperation with the reflection unit 160.

The reflection unit 160 has negative refractive power to further enlarge the image enlarged by the projection optical system 110, and allows an image with a wide angle to be reflected onto the screen (200 in FIG. 2). Referring to FIG. 2, the reflection unit 160 is disposed below the screen 200 to obliquely reflect an image onto the screen 200 and realize an ultra-slim image display device. To correct aberration that may occur when the image is reflected at a wide angel, the reflection unit 160 may be an aspherical mirror.

Even though the aberration is corrected by the reflection unit 160, distortion may occur. To eliminate such distortion, the projection optical system 110 preliminarily generates distortion with a shape opposite to the shape of the distortion generated by the reflection unit 160, thereby canceling the distortion generated by the reflection unit 160. For example, the second lens group 130 may generate first distortion to cancel the distortion generated by the reflection unit 160. Alternatively, the third lens group 140 may generate second distortion to cancel the distortion generated by the reflection unit 160. Also, the first and second distortions can be synthesized to cancel the distortion generated by the reflection unit 160.

Figure 4:
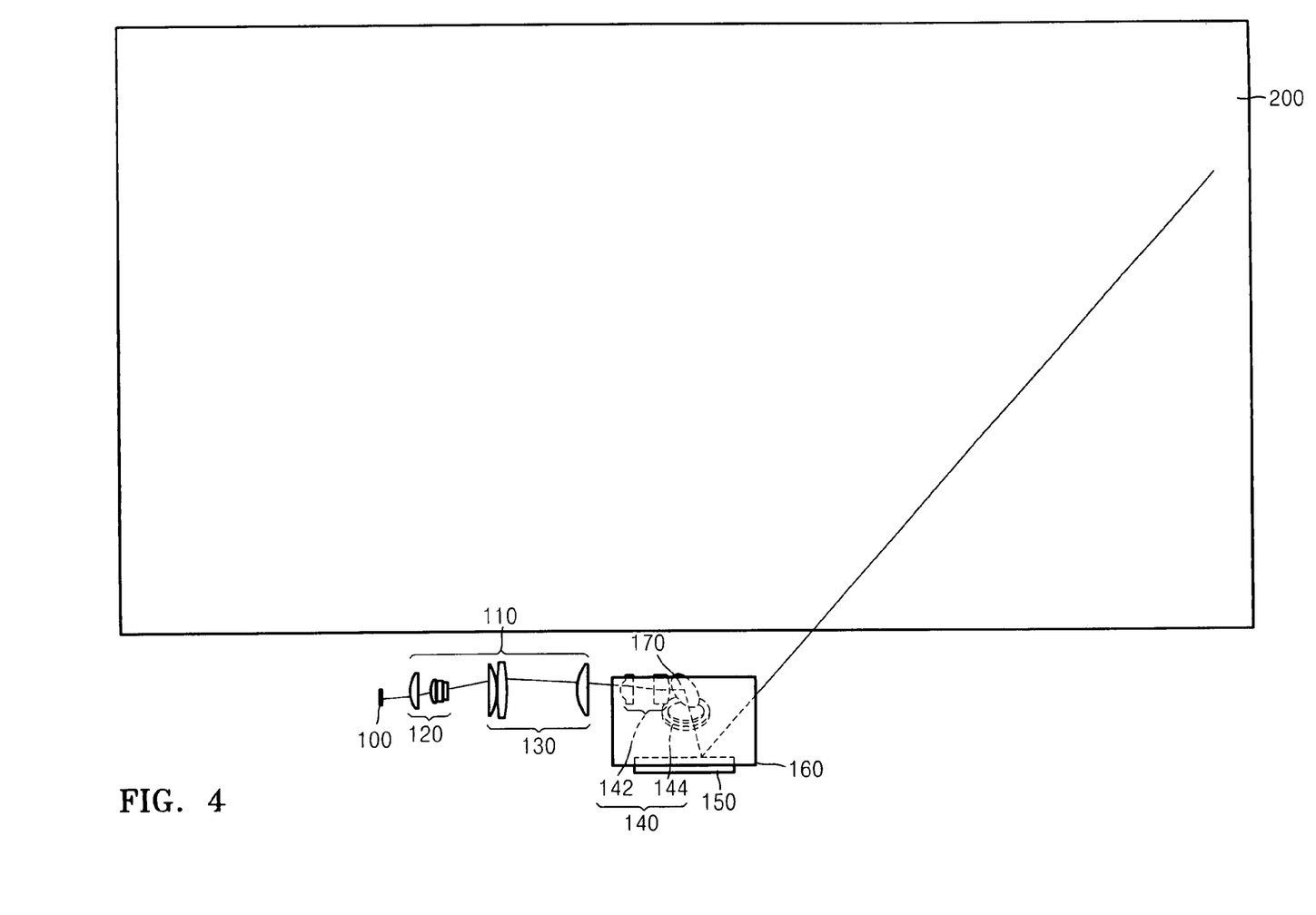
FIG. 4 is a schematic back view of the projection type image display device of FIG. 2.
Figure 5:
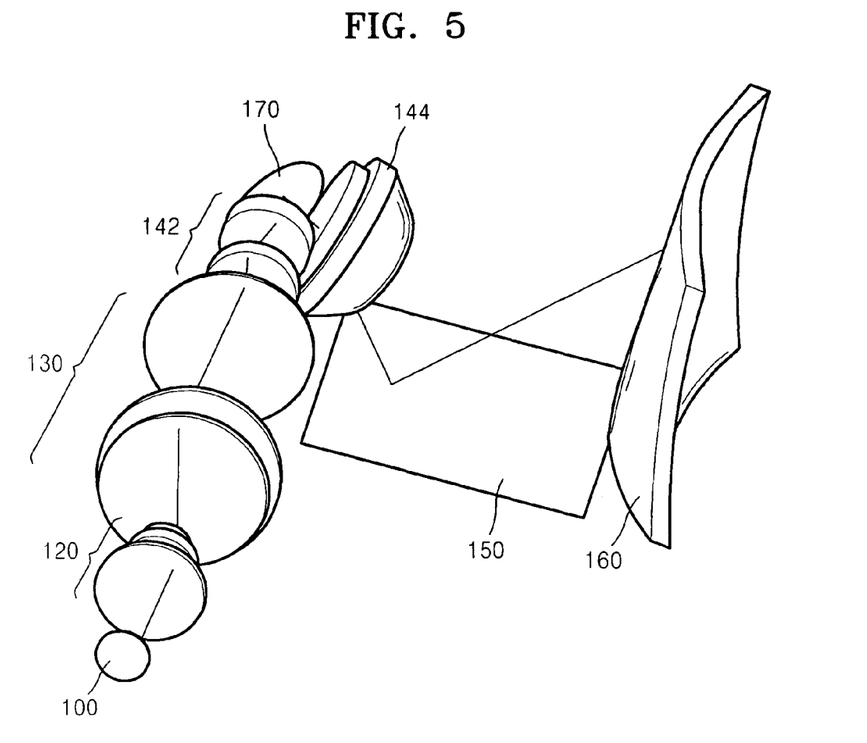
FIGS. 5 and 6 are optical diagrams of the projection optical system of FIG. 3.
Figure 6:
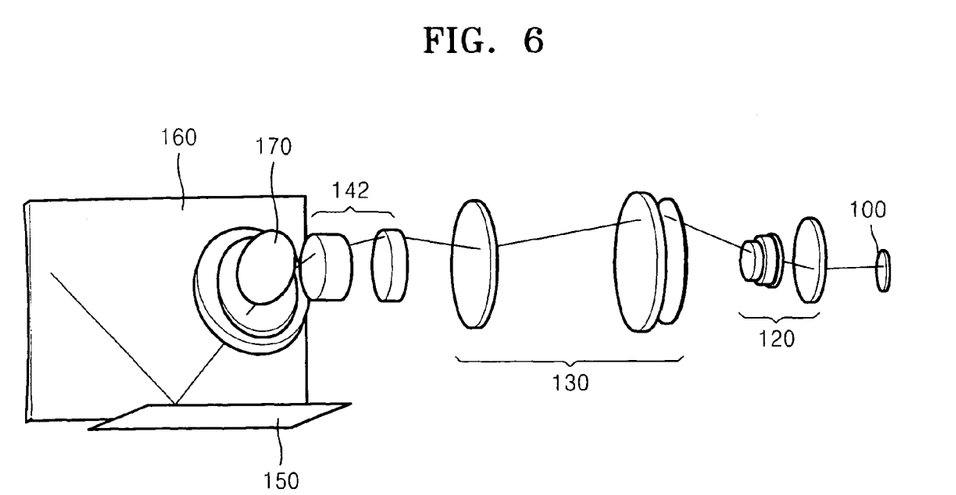

FIG. 4 is a schematic back view of the projection type image display device of FIG. 2. FIGS. 5 and 6 are optical diagrams of the projection optical system 110, the optical path changing unit 150, and the folding mirror 170. The optical arrangement of the projection type image display device according to an embodiment of the present invention will now be described with reference to FIGS. 2 through 6.

The screen 200 is disposed on the front side 211 of the cabinet 210.

Referring to FIG. 2, the projection optical system 110 is disposed in a space 205 enclosed by a horizontal plane P, the front side 211 of the cabinet 210, and a lower light ray plane L. The horizontal plane P is a plane that passes through the lower end of an effective plane S of the reflection unit 160 and is perpendicular to the screen 200. The effective plane S is a portion of the reflection plane of the reflection unit 160 from which light forming an image on the screen 200 is reflected. The lower light ray plane L is a plane formed by a light ray which forms the image on the screen 200 and is incident on the lowermost portion of the screen 200.

The optical axis of a last lens of the projection optical system 110 should intersect the optical path changing unit 150 such that light from the projection optical system 110 progresses toward the optical path changing unit 150 disposed on the bottom 212 of the cabinet 210. To this end, the folding mirror 170 is disposed within the third lens group 140 as illustrated in FIGS. 5 and 6.

The third lens group 140 may be divided into a first projection lens group 142, adjacent to the second lens group 130, and a second projection lens group 144, adjacent to the optical path changing unit 150. The folding mirror 170 forms a boundary between the first and second projection lens groups 142 and 144. The folding mirror 170 reflects light that has passed through the first projection lens group 142 to the second projection lens group 144. An angle at which the light is reflected may be controlled by changing an angle at which the folding mirror 170 is disposed.

The first projection lens group 142 may be disposed parallel to the front side of the cabinet 210 so that the projection optical system 110 can be disposed in the space 205. The first projection lens group 142 may also be disposed parallel to the bottom 212 of the cabinet 210. The optical axis of the second projection lens group 144 may be perpendicular to that of the first projection lens group 142 and faces the optical path changing unit 150.

The display element 100 and the first and second lens groups 120 and 130 are disposed coaxially with the optical axis of the first projection lens group 142 such that the series of optical elements including the display element 100 and the first projection lens group 142 is arranged in the space 205. Depending on the optical design, a second folding mirror for bending the optical path may be provided within the projection optical system 110, to further reduce the length of the projection optical system 110. For example, a folding mirror may be provided between the first lens group 120 and the second lens group 130.

The optical path changing unit 150 reflects light that has passed through the second projection lens group 144 to the reflection unit 160. The optical path changing unit 150 is disposed on the bottom 212 of the cabinet 210. The optical path changing unit 150 may be a flat mirror. Referring to FIG. 2, since the position of the screen 200 and the position of the reflection unit 160 corresponding thereto have a relatively small margin that can be controlled, the position of the projection optical system 110 in the space 205 can be disposed by controlling an inclination angle θ of the optical path changing unit 150.

Also, the optical path changing unit 156 may be disposed close to the reflection unit 160 such that the chin height, which is a distance between the bottom of the screen 200 and the bottom 212, may be further reduced.

When the projection type image display device according to an embodiment of the present invention realizes a 56-inch screen using a projection optical system having F/#2.5 and telecentric optical characteristics, the thickness B1 of the cabinet of the projection type optical system may be 230 mm or less, and the height A1 of the chin may be 160 mm. Therefore, an image display device having a small chin height and ultra-slim profile may be realized.

Figure 7:
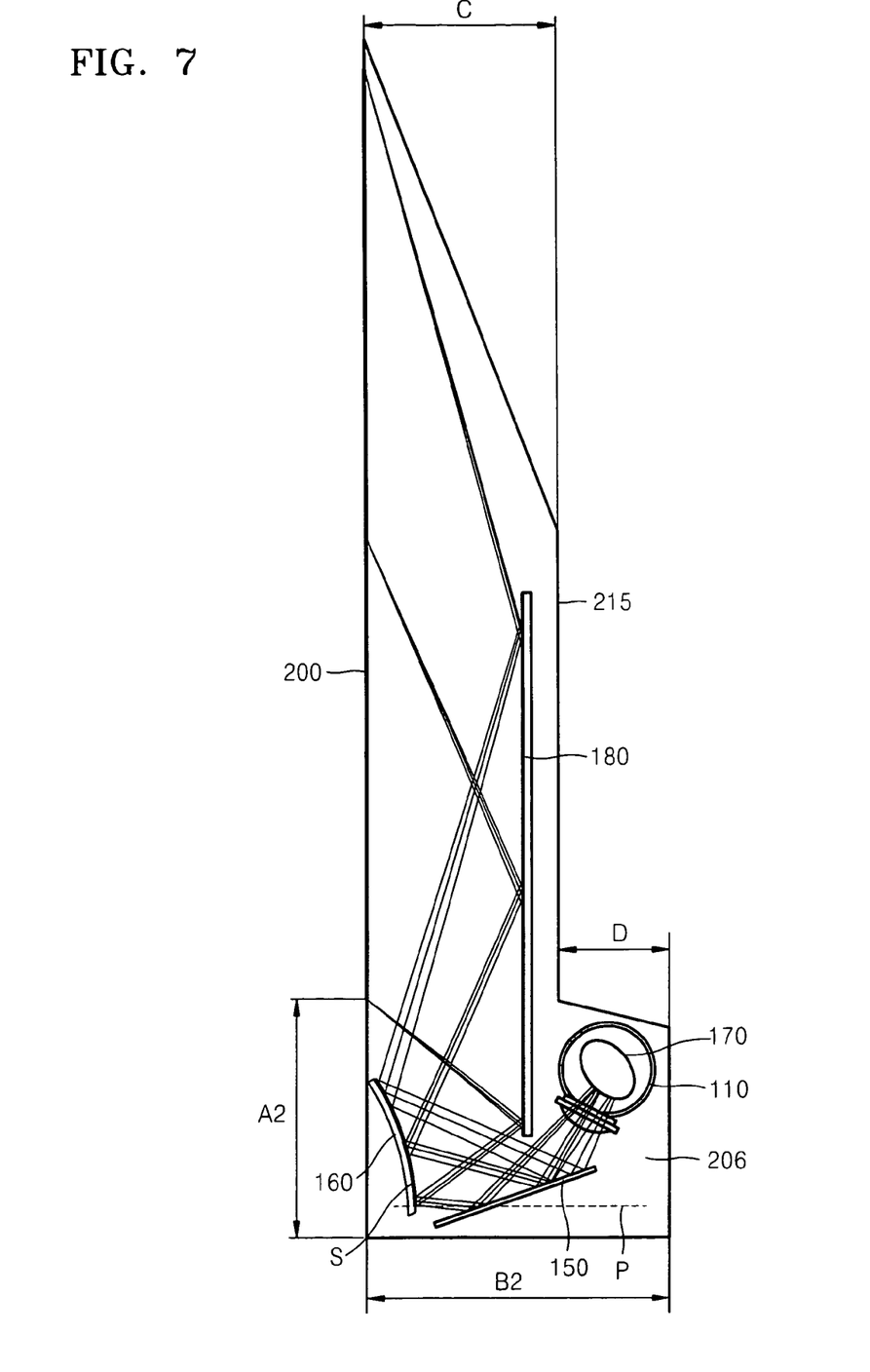
FIG. 7 is a schematic side view illustrating the optical arrangement of a projection type image display device according to another exemplary embodiment of the present invention.
Figure 8:
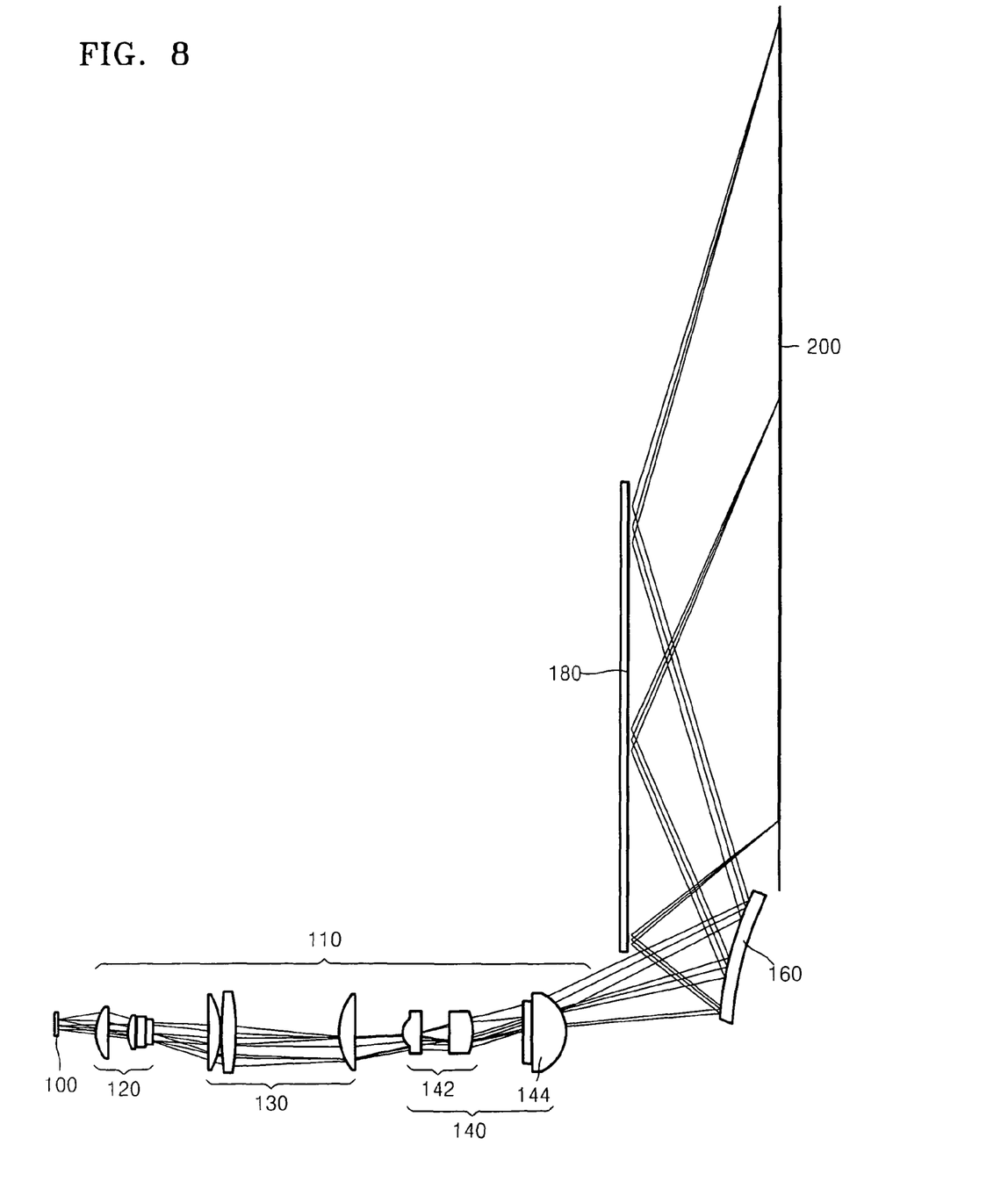
FIG. 8 is a schematic view illustrating a projection optical system of the projection type image display device of FIG. 7.

FIG. 7 is a schematic side view illustrating an optical arrangement of a projection type image display device according to another exemplary embodiment of the present invention, and FIG. 8 schematically illustrates an optical system between a display element 100 and a screen 200, excluding an optical path changing unit 150 and a folding mirror 170.

Referring to FIGS. 7 and 8, the projection type image display device includes a cabinet 215, the screen 200 disposed on the front side of the cabinet 215, a projection optical system 110 disposed behind the screen 200, an optical path changing unit 150 disposed on the bottom of the cabinet 215, a reflection unit 160 disposed below the screen 200, a back mirror 180 disposed parallel to the screen 200, between the screen 200 and the projection optical system 110, and a folding mirror 170 disposed within the projection optical system 110. The projection optical system 110 includes first through third lens groups 120, 130, and 140.

Referring to FIGS. 7 and 8, since an optical system between a display element and the reflection unit 160 in the projection type image display device according to the present embodiment is the substantially same as the optical system in the projection type image display device according to the previous embodiment, descriptions of the construction and operation thereof will be omitted. An optical path relating to the back mirror 180 and the projection optical system 110 will now be described in detail.

Referring to FIG. 7, the projection optical system 110 is disposed above a horizontal plane P, in a space 206 behind the back mirror 180. The horizontal plane P passes through the lower end of an effective plane S of the reflection unit 160 and is perpendicular to the screen 200.

The cabinet 215 may be thin and the projection optical system 110 may be disposed close to the back side of the back mirror 180.

The optical path changing unit 150 reflects light from the projection optical system 110 to the reflection unit 160.

The reflection unit 160, disposed below the screen 200, and the screen 200 are positioned on the same side of the back mirror 180. The reflection unit 160 reflects light reflected by the optical path changing unit 150 to the back mirror 180 at a wide angle.

The back mirror 180, disposed parallel to the screen 200, reflects the light reflected by the reflection unit 160 to the screen 200. Referring to FIG. 7, the back mirror 180 is disposed above the upper portion of the optical path changing unit 150 and is separated a predetermined distance from the optical path changing unit 150, such that an optical path formed by the projection optical system 110, the optical path changing unit 150, and the reflection unit 160 is not disturbed.

When a projection type optical system according to the present exemplary embodiment of the present invention is realized with a 56-inch screen using a projection optical system having F/#2.5 and telecentric optical characteristics, a distance C between the screen 200 and the back of the cabinet 215 may be 110 mm or less, and the thickness of a portion of the cabinet 215 where the projection optical system 110 is installed may be 110 mm. In this case, the thickness B2 of the projection type image display device may be 230 mm or less, and the height A2 of the chin of the projection type image display device may be 150 mm. Therefore, an image display device having a small chin height and ultra-slim profile may be realized.

The mirror for folding an optical path in the above-described embodiments is an example of an optical path changing device that may be used, and may be replaced by an optical path changing device such as a total reflection prism according to an optical design.

As described above, the projection type image display device according to the present invention includes the optical path changing device, thereby providing a projection type image display device having a reduced chin height and a slim profile. That is, a residual space outside the space where light incident on the screen travels is utilized, and an optical engine is disposed in the residual space such that the projection type image display device may be compact.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A projection type image display device comprising:
   a cabinet;
   a screen disposed on a front side of the cabinet;
   a projection optical system, disposed below the screen, which enlarges and projects an image formed by a display element;
   an optical path changing unit, disposed below the projection optical system, which reflects the image enlarged and projected by the projection optical system; and
   a reflection unit, disposed obliquely to the screen and below the screen, which receives the image reflected by the optical path changing unit and reflects the image toward the screen, such that each light ray from the reflection unit to the screen is straight and not reflected between the reflection unit and the screen,
   wherein the projection optical system is disposed in a space above a horizontal plane that passes through a lower end of an effective plane of the reflection unit and is perpendicular to the screen, behind the front side of the cabinet, and below a lower light ray plane formed by a straight path of a light ray reflected from the reflection unit and incident on a bottom of the screen.

2. The projection type image display device of claim 1, wherein the projection optical system comprises:
   a first lens group which controls the focus of an image formed by the display element;
   a second lens group which converts the image formed by the first lens group into an intermediate image; and
   a third lens group which enlarges and projects the intermediate image formed by the second lens group.

3. The projection type image display device of claim 2, wherein the third lens group comprises a folding mirror which bends the optical path of the third lens group.

4. The projection type image display device of claim 3, wherein the third lens group further comprises:
   a first projection lens group located between the second lens group and the folding mirror; and
   a second projection lens group located between the folding mirror and the optical path changing unit,
   wherein the optical axis of the first projection lens group is parallel to the front side of the cabinet.

5. The projection type image display device of claim 4, wherein the optical axis of the first projection lens group is parallel to the bottom of the cabinet.

6. The projection type image display device of claim 5, wherein the optical axes of the display element, the first and second lens groups, and the first projection lens group are the same.

7. The projection type image display device of claim 5, wherein the optical axis of the second projection lens group is perpendicular to the optical axis of the first projection lens group.

8. The projection type image display device of claim 2, wherein the first lens group is telecentric.

9. The projection type image display device of claim 2, wherein the first lens group comprises at least one aspherical lens.

10. The projection type image display device of claim 2, wherein the second lens group generates a first distortion which cancels a distortion generated by the reflection unit.

11. The projection type image display device of claim 2, wherein the third lens group generates a second distortion which cancels a distortion generated by the reflection unit.

12. The projection type image display device of claim 2, wherein the second lens group generates a first distortion and the third lens group generates a second distortion, and the first and second distortions jointly cancel a distortion generated by the reflection unit.

13. The projection type image display device of claim 1, wherein the reflection unit is an aspherical mirror.

14. A projection type image display device comprising:
   a cabinet;
   a screen disposed on a front side of the cabinet;
   a projection optical system, disposed below the screen, which enlarges and projects an image formed by a display element;
   an optical path changing unit, disposed on the bottom of the cabinet, which reflects the image enlarged and projected by the projection optical system;
   a reflection unit, disposed below the screen, which reflects the image reflected by the optical path changing unit; and
   a back mirror, disposed parallel to the screen between the screen and the projection optical system, which reflects the image reflected by the reflection unit to the screen,
   wherein the projection optical system is disposed above a horizontal plane that passes through the lower end of an effective plane of the reflection unit and is perpendicular to the screen.

15. The projection type image display device of claim 14, wherein the projection optical system comprises:
   a first lens group which controls the focus of an image formed by the display element;
   a second lens group which converts the image formed by the first lens group into an intermediate image; and
   a third lens group which enlarges and projects the intermediate image formed by the second lens group.

16. The projection type image display device of claim 15, wherein the third lens group comprises a folding mirror which bends the optical path of the third lens group.

17. The projection type image display device of claim 16, wherein the third lens group further comprises:
   a first projection lens group located between the second lens group and the folding mirror; and
   a second projection lens group located between the folding mirror and the optical path changing unit,
   wherein the optical axis of the first projection lens group is parallel to the front side of the cabinet.

18. The projection type image display device of claim 17, wherein an optical axis of the first projection lens group is parallel to the bottom of the cabinet.

19. The projection type image display device of claim 18, wherein the optical axes of the display element, the first and second lens groups, and the first projection lens group are the same.

20. The projection type image display device of claim 18, wherein the optical axis of the second projection lens group is perpendicular to the optical axis of the first projection lens group.

* * * * *